United States Patent
Kaplan

(10) Patent No.: US 6,215,489 B1
(45) Date of Patent: Apr. 10, 2001

(54) SERVICE CREATION ENVIRONMENT (META MODEL EDITOR)

(75) Inventor: Robert Kaplan, Kensington, CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/343,697

(22) Filed: Jun. 30, 1999

Related U.S. Application Data

(62) Division of application No. 09/163,628, filed on Sep. 30, 1998.

(51) Int. Cl.[7] .................................................. G06F 3/14
(52) U.S. Cl. ........................................ 345/334; 345/335
(58) Field of Search ................................. 379/201, 210, 379/211, 904; 345/333, 347, 334, 349, 342, 335, 336–338, 339, 340, 352–354, 356–357

(56) References Cited

U.S. PATENT DOCUMENTS

| | | | | |
|---|---|---|---|---|
| 5,448,695 | * | 9/1995 | Douglas et al. | 345/334 |
| 5,572,583 | * | 11/1996 | Wheeler, Jr. et al. | 379/207 |
| 5,583,920 | * | 12/1996 | Wheeler, Jr. | 379/88 |
| 5,859,644 | * | 1/1999 | Stokes et al. | 345/431 |
| 5,870,611 | * | 2/1999 | London Shrader et al. | 395/712 |
| 5,892,510 | * | 4/1999 | Lau et al. | 345/333 |
| 5,969,717 | * | 10/1999 | Ikemoto | 345/333 |
| 5,973,686 | * | 10/1999 | Shimogori | 345/333 |

\* cited by examiner

*Primary Examiner*—Steven Sax
(74) *Attorney, Agent, or Firm*—Carter, Ledyard & Milburn

(57) ABSTRACT

Data base admin uses Explorer-style interface with topic tree configurable though Meta Model Editor (GUI) with immediate effect on actual program rather than requiring software code changes. All changes are saved as "data". All data is displayed as "Grid" or as "Property Sheet", with GUI to:
 a. change display capabilities,
 b. change validation, and
 c. change defaults.

4 Claims, 8 Drawing Sheets

Browser 2 (Primary Field Definitions)

Field #1

- Caption: Holiday
- File ID: Hol ###
- Column Width: 25
- Editable: Yes
- Edit Mask: Alpha
- Menu Items: None

[OK] [Cancel]

Browser 2 (Primary Field Definitions)

Field #2

- Caption: Date
- File ID: Dat ###
- Column Width: Default
- Editable: Yes
- Edit Mask: Numeric
- Menu Items: None

[OK] [Cancel]

SERVICE CREATION ENVIRONMENT (META MODEL EDITOR)

This application is a divisional of 09/163,628 filed Sep. 30, 1998.

BACKGROUND OF THE INVENTION

Enhanced services telephone systems such as prepaid calling systems are well known. Subscribers in such systems are provided with a calling card containing a personal identification number ("PIN") by which the amount of telephone usage remaining on the card can be determined by the subscriber at the time the call is placed.

In known prepaid telephone systems, there are a number of work stations to assist the service provider in performing the various functions needed for the operation of the system. These functions include (a) the administration of the subscriber database which controls call utilization, (b) the interface with the customer regarding the balance in the subscriber's account, the status of the account and recharging of prepaid cards by a subscriber, (c) the live operators who assist in the placing of the calls, and (d) system administration which often spans multiple servers and even multiple locations.

Heretofore, to modify these functions or to add new functions to the prepaid system required the loading of new software or the rewriting of the existing code. Clearly the time and expense of implementing the change impacted the ability of such systems to respond to growth in the system, the changing needs of subscribers, etc.

The present invention addresses these problems by providing a method of altering the functionality within a system by modifying the data instead of code.

Additionally, the configuration of each of the high level functions may be selectively customized by means of a user configurable table, in which the settings used to reconfigure the software are recorded as data thus obviating the necessity to load an additional program and/or rewriting code.

Accordingly, it is an object of the present invention to provide a novel method and system which obviates many of the problems of known telephone systems with great financial and temporal savings.

It is another object of the present invention to provide a novel method and system which permits a single computer software program to be used for all workstations in the system.

It is yet another object of the present invention to provide a novel method and system which permits the computer software program to be modified by business analysts rather than engineers or other technicians, all without the necessity to modify the software program.

It is a further object of the present invention to provide a novel software program that reduces retraining requirements by using a single program having a basically consistent user interface to implement database changes for all functions.

It is yet a further object of the present invention to provide a novel method and system which reduces system ownership costs due to the multiple functions which can be performed on a single workstation.

It is still a further object of the present invention to provide a novel system and method to allow the customer to add functions to the system in such a way that these functions appear well integrated in the user interface.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIGS. 6–7 illustrate the browser entries necessary to generate the displays of FIGS. 1 and 8.

DESCRIPTION OF PREFERRED EMBODIMENTS

Figure 1:
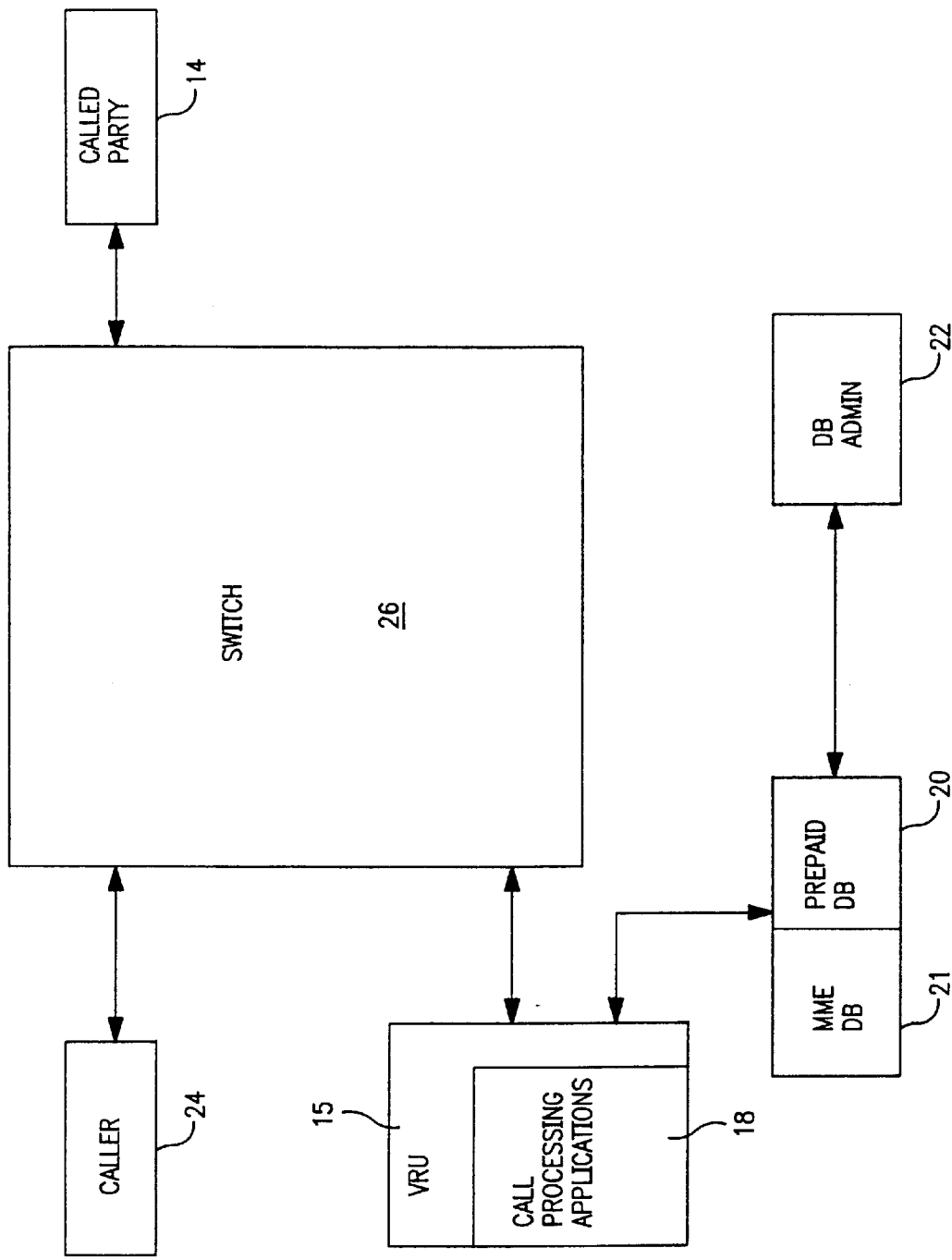
FIG. 1 is a functional block diagram showing the basic organization of the enhanced services system of the present invention in the embodiment of a prepaid telephone system.

The present invention finds applicability in an enhanced services environment such as the prepaid telephone system illustrated in FIG. 1. FIG. 1 shows a suitable conventional telephone switch 26 such as the Harris Corporation 20/20 switch in a conventional public switched telephone network (PSTN) connected to large numbers of subscriber telephones such as the caller telephones 24 and the called party telephones 14. Also connected to the switch 26 may be a bank of voice response units (VRUs) 15 on which the prepaid call processing application 18 resides.

The management of a prepaid system is generally under the control of a call processing application resident within the VRU. The call processing application, in association with peripheral equipment, determines the action to be taken (e.g., determining the correctness of a PIN entry, the prompting of users for destination numbers or desired services, outdialing to a requested telephone number, etc.) during the processing of a call request.

In addition to the hardware and software requirements of the prepaid system, a large personnel support group comprising database administrators, system administrators, customer service representatives and live operators is required to assist the service provider in performing the various functions needed for the operation of the system.

Figure 2:
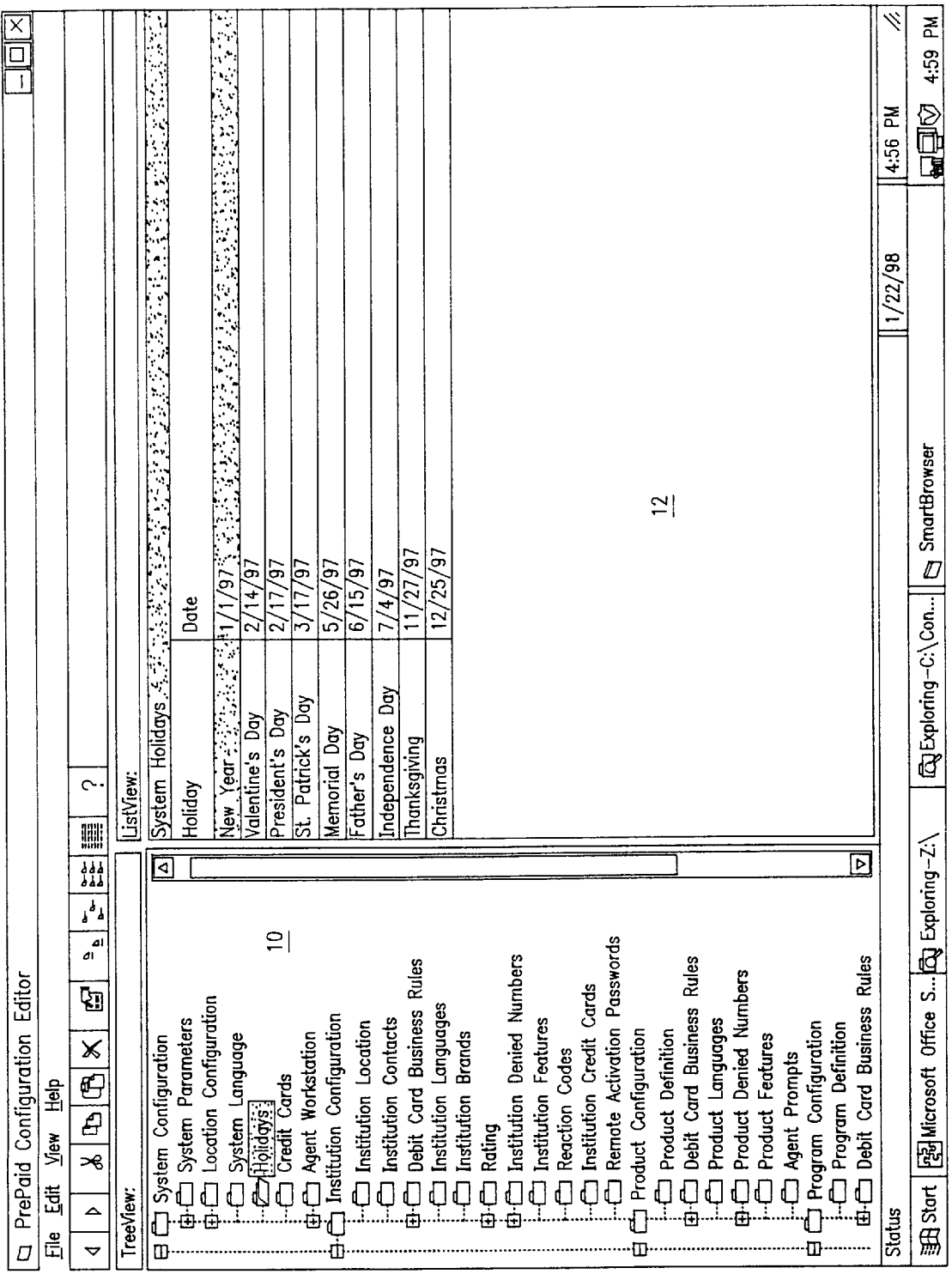
FIG. 2 illustrates the representative topic tree and browser for a DB-Admin application.

In one embodiment of the present invention, the personnel support divisions use a common software application ("DB-Admin") 22 to configure the prepaid database 20 and perform the various administrative functions associated with the prepaid system. As illustrated in FIG. 2, DB-Admin 22 uses an Explorer-style interface that contains a Topic Tree 10 and a Browser 12 with the Browser 12 displaying data associated with a selected topic from the Topic Tree 10 in either a "grid" (as shown) or a "property sheet" format.

The content and "look and feel" of DB-Admin is created through the use of a Service Creation Environment ("Meta Model Editor"). The Meta Model Editor allows a system user to "alter" DB-Admin through the manipulation of data instead of the modifying of code thereby obviating the need for engineers. A separate database, MME database 21 (see FIG. 1), is associated with the Meta Model Editor and is responsible for driving the display of the DB-Admin. Objects contained within the MME database 21 control the DB-Admin displays (Topic Tree and Browser) responsive to user input. The Meta Model Editor allows the user to be brought step-by-step through the process of making a complex change to the DB-Admin database. Changes made to the DB-Admin database are continually drawn into/associated with the objects of the MME database 21; no compilation process is required.

The Meta Model Editor is used to configure both the Topic Tree 10 and the Browser 12 of DB-Admin. As the MME objects controlling these displays are continually updated, changes made through the Meta Model Editor to the topic tree 10 and Browser 12 take immediate effect on the actual DB-Admin program. For example, if the two programs (DB-Admin and MME) were placed side by side, changes made by a "business analyst" in the Meta Model Editor would be immediately reflected in DB-Admin upon the next click of the DB-Admin Topic Tree 10.

To facilitate the use of the Meta Model Editor by DB-Admin users, the user interface to the Meta Model Editor is the same as that provided for DB-Admin. The Meta Model Editor differs however from DB-Admin in the preferred embodiment in that five browsers are provided with the Meta Model Editor. These five browsers, defining the scope or breadth of configurability within the Service Creation Environment, determine the data set to be displayed in the DB-Admin Topic Tree and Browser (including the sort order), the format of the DB-Admin Brower (grid or property sheet), captions (i.e., labels) for all fields and for the DB-Admin browser as a whole, the format of each field, drop-down combo boxes to support entry in each field, edit-masks to filter entry in each field, the default column width for each field, and record modification (add, delete, update) and associated special dialog links.

Figure 3:
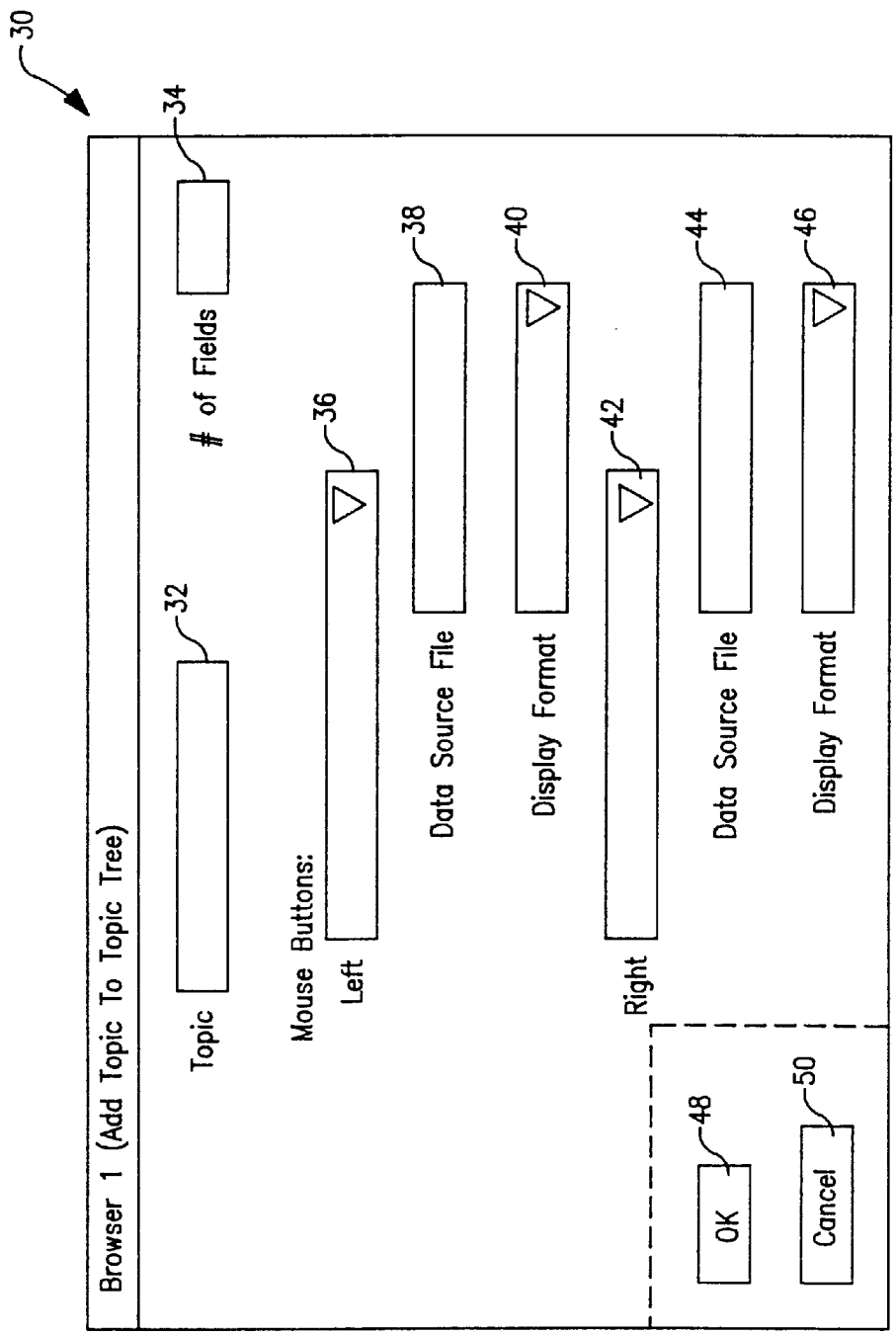
FIGS. 3–5 illustrate representative browser windows for one embodiment of the present invention.

The first browser ("Browser 1") defines the DB-Admin topic tree and the primary data table or grid for the DB-Admin browser including the effect of clicking the left and right mouse buttons on any selected topic or field. A typical window associated with Browser 1 is illustrated in FIG. 3.

Figure 4:
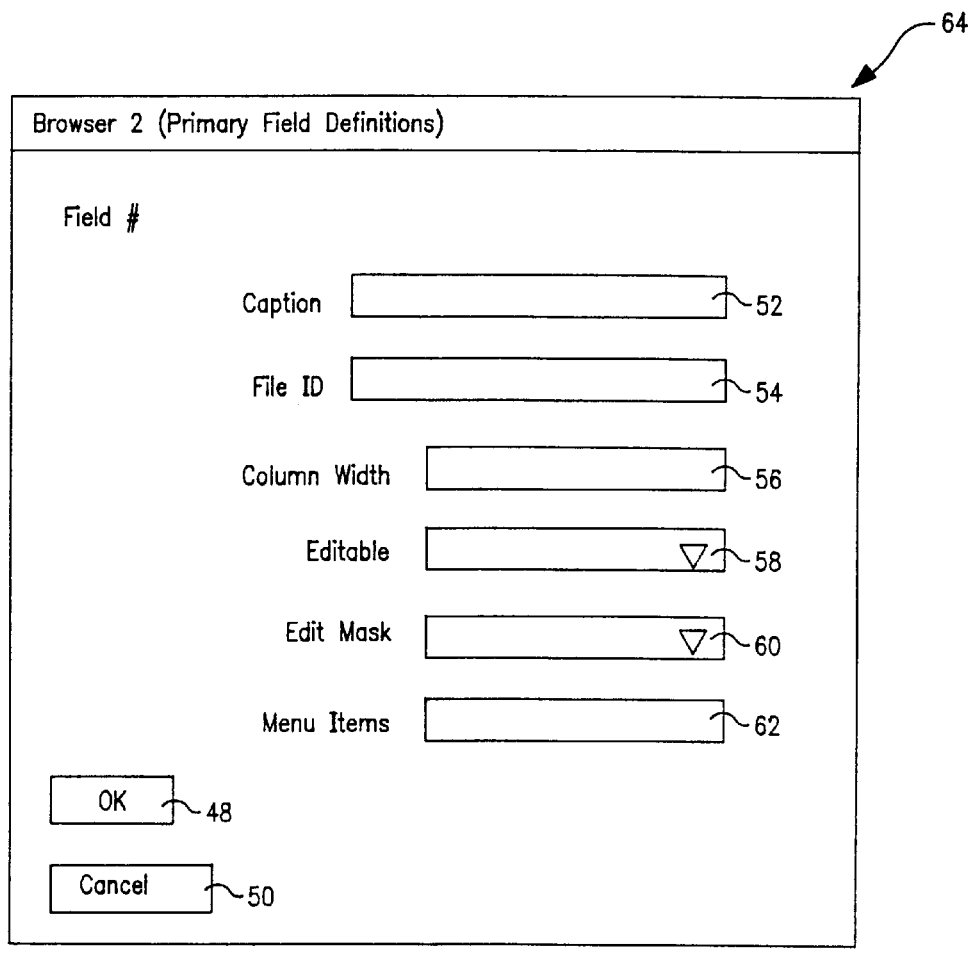

As illustrated in FIG. 4, the second browser ("Browser 2") defines the table or view to be displayed. It determines the table caption, whether the table is editable, and what should appear on a pop-up menu if the user presses the right-mouse button.

The third browser ("Browser 3") defines the fields to be displayed in any grid including their captions, display formats, edit masks, pick lists, alignment, visibility, and editability.

The fourth browser ("Browser 4") defines the fields which will be seen in a grid field's pick list. It also tells the system how to order the rows and which field in the pick list (visible or not) will be pulled into the grid.

The final browser ("Browser 5") defines the validation rules for the individual fields. For example, a validation rule may require that an "end date" cannot precede a "start date".

With reference again to FIG. 2, DB-Admin browser 12 is displaying the data associated with the selected HOLIDAY sub-topic in the topic tree 10. In one embodiment of the present invention, to add a sub-topic to the DB-Admin topic tree 10, the user would click the right mouse button on the desired "parent" topic, in this case the System Configuration topic, resulting in the display of the Meta Model Editor Browser 1 window illustrated in FIG. 6.

Figure 6:
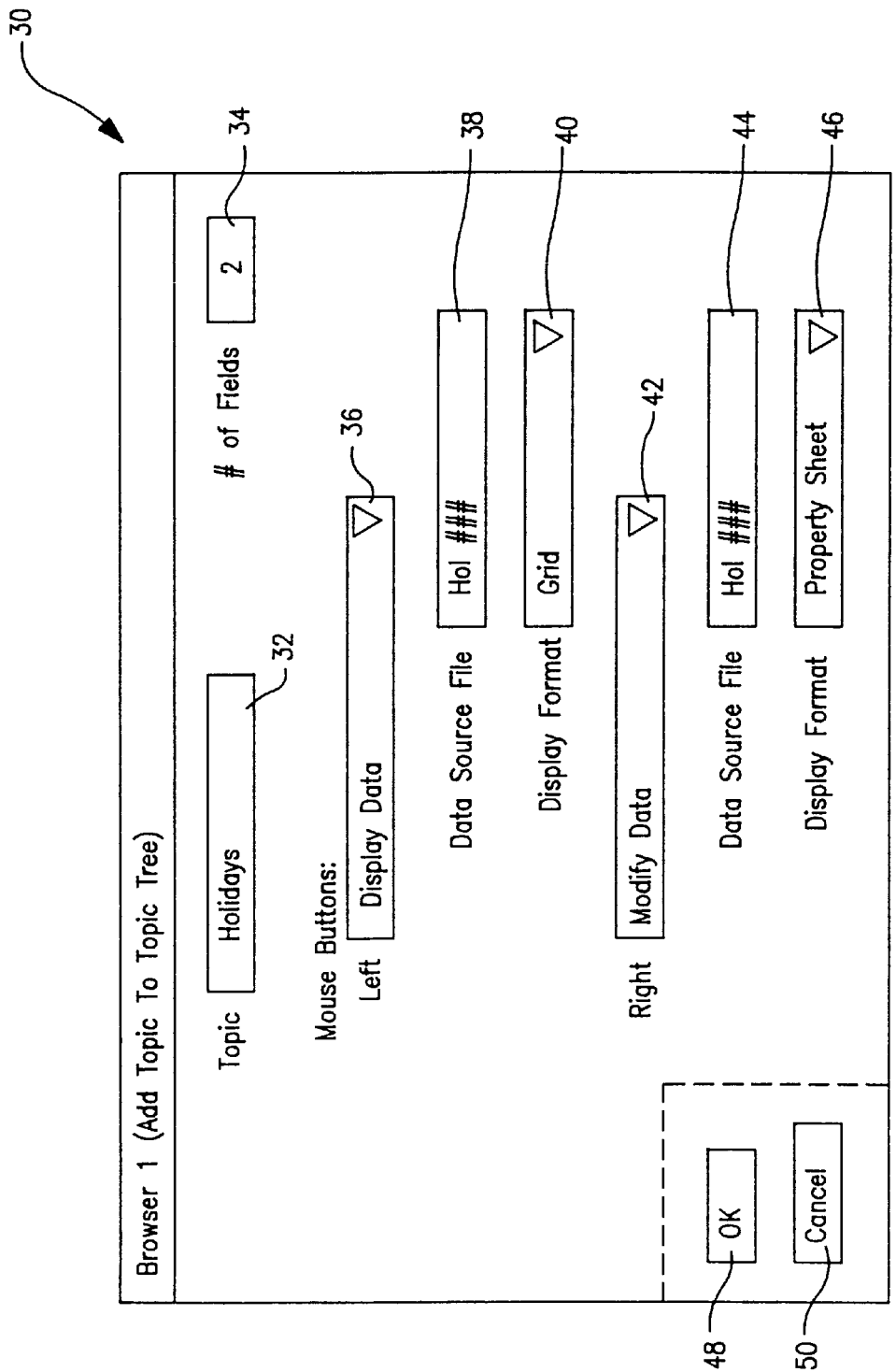

As shown in FIG. 6, Browser 1 defines the topic to be displayed in the topic tree 10 ("Holidays"), the number of fields to be displayed in any associated view ("2"), the effect of clicking the left mouse button after selecting the new sub-topic (i.e., the display of the data in the browser 12 in a grid format), and the effect of clicking the right mouse button after selecting the new sub-topic (i.e., the display of a modify data window in a property sheet format).

After the user fills in the appropriate information and clicks the OK button, the Browser 2 windows shown in FIG. 7 are displayed consecutively (one window for each field defined in Browser 1). These Browser 2 windows define the fields to be displayed in either the browser 12 (if "Holidays" is selected with left mouse button) or the modification window (if "Holidays" is selected with the right mouse button) as defined in the Browser 1 window (FIG. 6). The Browser 2 windows define two fields "Holiday" and "Date", the "Holiday" field having a specified column width while the "Date" field defaults to the remaining area, neither field having a pick list, and with each field having an edit mask, alphabetical and numerical respectively.

Figure 8:
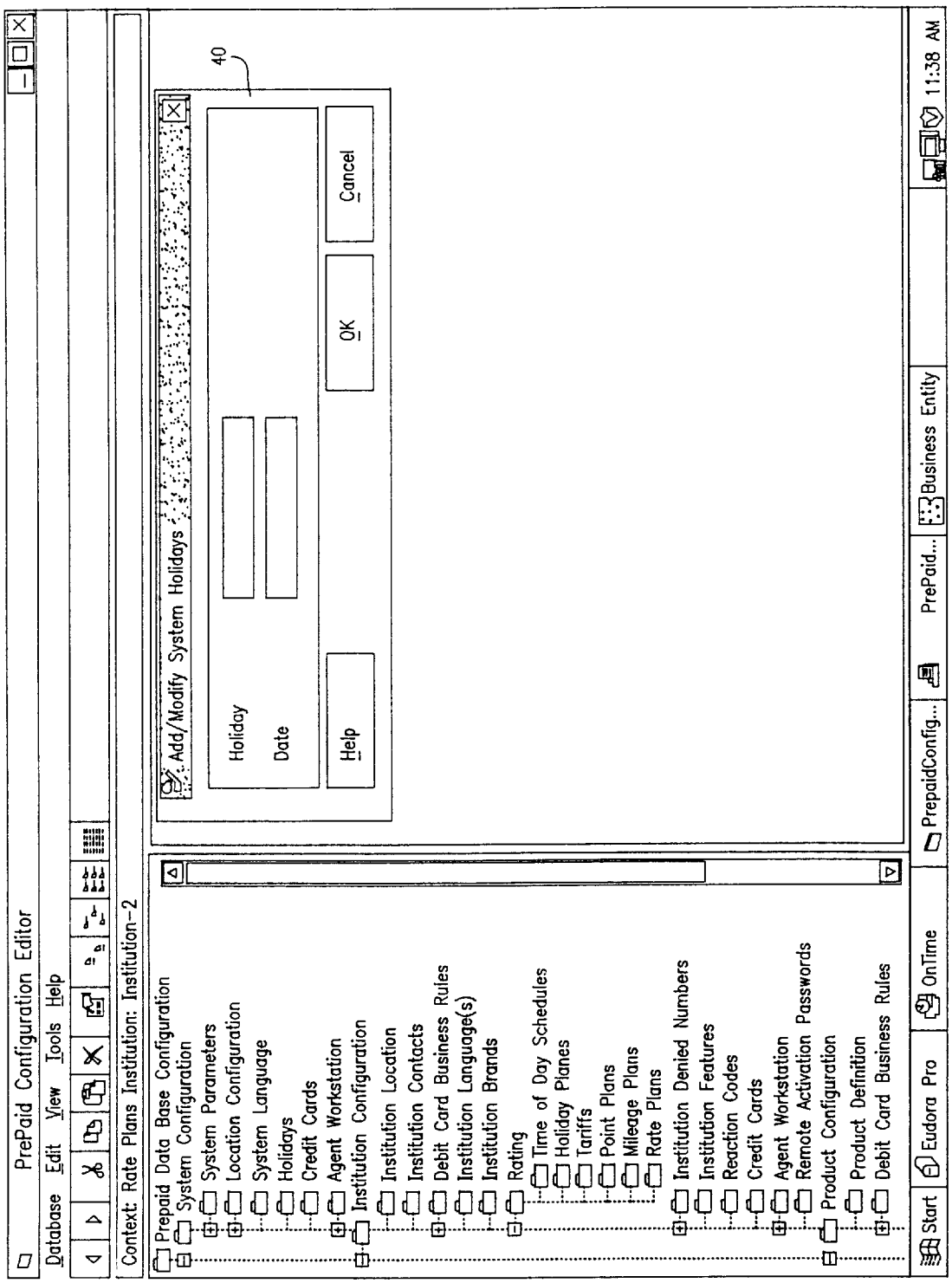
FIG. 8 illustrates a modification window associated with the DB-Admin application of FIG. 2.

The browser 12 of FIG. 2 and the Add/Modify Systems Holiday window 40 of FIG. 8 illustrate how the information defined in Browsers 1 and 2 are displayed in the DB-Admin application.

Figure 5:
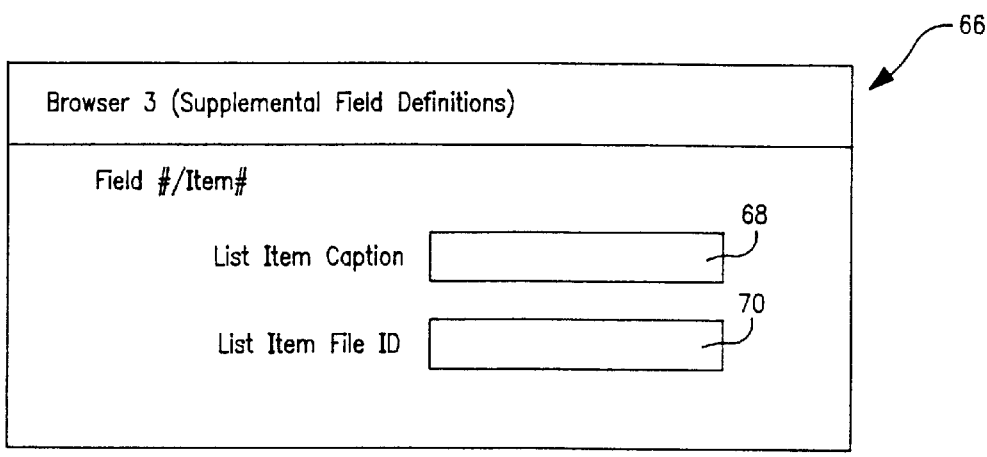
Figure 9:
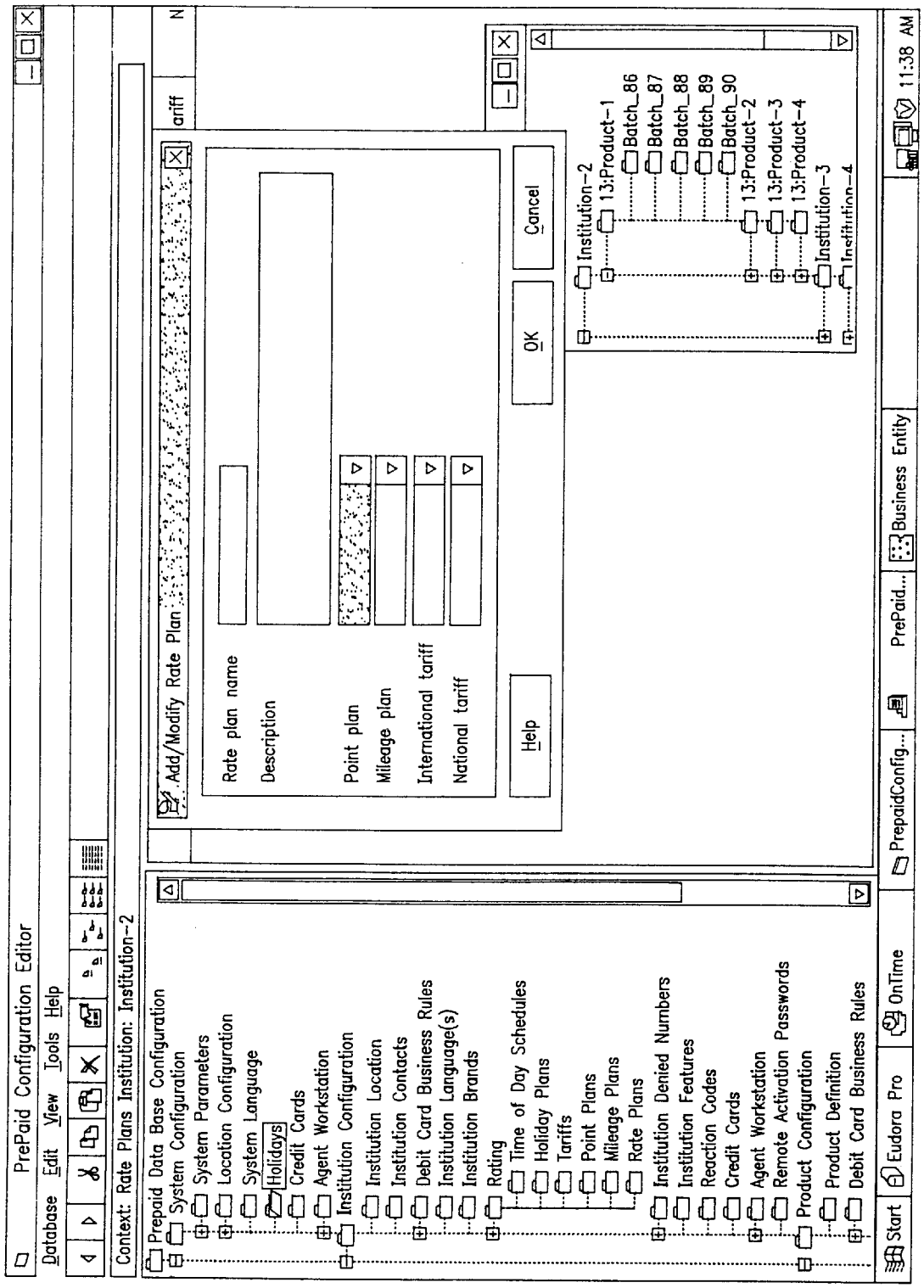
FIG. 9 illustrates representative picklists which may be associated with the browser window of FIG. 5.

FIG. 9 shows another DB-Admin modification window having pick lists associated with the field entries. These pick lists would be governed by Browser 3 and defined through a Browser 3 window similar to that illustrated in FIG. 5.

By removing object properties to a database, the present invention provides a programming tool at the application level for use by an end user. Further, to facilitate use, the present invention provides a common interface for both modifying and using applications.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A telephone system comprising:
   a telephone switch connected to a plurality of subscriber telephones;
   means for call processing subscriber telephone calls;
   a first database containing subscriber information;
   means for providing subscriber information to said call processing means;
   display means to display information in said first database in a definable format;
   a second database containing modifiable objects which define the format of information displayed in said display means;
   editing means for modifying the objects contained in said second database; and
   means responsive to the modification of the objects contained in the second database to thereby modify the format of the displayed information;
   wherein said display means includes a least one browser and displays a plurality of topics in a topic tree and configurable data associated with each of the plurality of topics, and wherein the topic tree of said display means provides access to the data displayed in any browser associated therewith to thereby permit configuration of the displayed data; and
   said editing means controls the format of the display topics and configuration and selection of the configurable data displayed by said display means.

2. The system of claim 1 wherein said display means and said editing means utilize a common user interface.

3. The system of claim 1 wherein said editing means comprises means for defining the topic tree and the primary data table or grid by means of a pop-up menu identifying the number and identity of the sources of data;
- means for defining the table or view to be displayed to include the table caption, whether the table is editable, and what should appear on a pop-up menu if the user presses the right-mouse button;
- means for defining the fields to be displayed in any grid including the fields' captions, display formats, edit masks, pick lists, aligment, visibility, and editability;
- means for defining the fields which will be seen in a grid field's pick list, how to order the rows of the grid, and which field in the pick list (visible or not) will be pulled into the grid; and
- means for defining the validation rules for the individual fields.

4. The system of claim 1 wherein topic tree of the display means includes a menu for altering the topic tree by adding, deleting and/or moving topics displayed on the tree.

* * * * *